United States Patent
Jang et al.

(10) Patent No.: US 9,197,102 B2
(45) Date of Patent: *Nov. 24, 2015

(54) STATOR ASSEMBLY FOR MOTOR HAVING HALL SENSOR PART FIXED TO END OF TOOTH OF STATOR

(75) Inventors: Jeong Cheol Jang, Gwangju (KR); Ji Min Lee, Gwangju (KR)

(73) Assignee: NEW MOTECH CO., LTD., Gwangju (KR)

( * ) Notice: Subject to any disclaimer, the term of this patent is extended or adjusted under 35 U.S.C. 154(b) by 468 days.

This patent is subject to a terminal disclaimer.

(21) Appl. No.: 13/639,243

(22) PCT Filed: Mar. 8, 2011

(86) PCT No.: PCT/KR2011/001593
§ 371 (c)(1),
(2), (4) Date: Dec. 10, 2012

(87) PCT Pub. No.: WO2011/139017
PCT Pub. Date: Nov. 10, 2011

(65) Prior Publication Data
US 2013/0106237 A1 May 2, 2013

(30) Foreign Application Priority Data

May 4, 2010 (KR) .................. 10-2010-0041817

(51) Int. Cl.
| | |
|---|---|
| *H02K 3/32* | (2006.01) |
| *H02K 1/12* | (2006.01) |
| *H02K 3/38* | (2006.01) |
| *H02K 3/52* | (2006.01) |
| *H02K 29/08* | (2006.01) |

(Continued)

(52) U.S. Cl.
CPC ................ *H02K 1/12* (2013.01); *H02K 3/325* (2013.01); *H02K 3/38* (2013.01); *H02K 3/522* (2013.01); *H02K 15/10* (2013.01); *H02K 29/08* (2013.01); *H02K 1/146* (2013.01); *H02K 1/187* (2013.01); *H02K 2203/12* (2013.01); *Y10T 29/49009* (2015.01)

(58) Field of Classification Search
CPC .......... H02K 3/32; H02K 3/325; H02K 3/34; H02K 3/345; H02K 29/08; H02K 11/0021
USPC ...................... 310/45, 43, 254.1, 214, 215
See application file for complete search history.

(56) References Cited

U.S. PATENT DOCUMENTS

| | | | |
|---|---|---|---|
| 2005/0067914 A1* | 3/2005 | Baba et al. .................. | 310/215 |
| 2008/0122300 A1* | 5/2008 | Cho et al. .................... | 310/43 |

FOREIGN PATENT DOCUMENTS

| | | |
|---|---|---|
| JP | S63-124044 U | 8/1988 |
| JP | H01-278242 A | 11/1989 |

(Continued)

OTHER PUBLICATIONS

Machine translation of JP 2009089588 A (Apr. 2009).*

*Primary Examiner* — Michael Andrews
(74) *Attorney, Agent, or Firm* — Paratus Law Group, PLLC

(57) ABSTRACT

The present invention relates to a stator assembly that includes: a stator core having a circular base, a plurality of teeth radially formed along an outer circumference of the base, and at least one coupling bushing formed along an inner circumference of the base; an insulation coating layer formed on a surface of the stator core; and a pair of base insulators coupled to top and bottom portions of the base, respectively.

6 Claims, 6 Drawing Sheets

(51) Int. Cl.
*H02K 15/10* (2006.01)
*H02K 3/34* (2006.01)
*H02K 11/00* (2006.01)
*H02K 1/14* (2006.01)
*H02K 1/18* (2006.01)

(56) References Cited

FOREIGN PATENT DOCUMENTS

| | | |
|---|---|---|
| JP | 2006-340425 A | 12/2006 |
| JP | 2008-022674 A | 1/2008 |
| JP | 2009-089588 A | 4/2009 |
| JP | 2009089588 A * | 4/2009 ............ H02K 11/00 |
| JP | 2010-088235 A | 4/2010 |
| KR | 10-0898164 B1 | 4/2004 |
| KR | 10-2004-0044711 A | 5/2004 |
| KR | 20-0408923 Y1 | 2/2006 |
| KR | 10-2006-0078845 A | 7/2006 |
| KR | 10-2008-0049990 A | 6/2008 |
| KR | 10-2008-0081412 A | 9/2008 |

* cited by examiner

STATOR ASSEMBLY FOR MOTOR HAVING HALL SENSOR PART FIXED TO END OF TOOTH OF STATOR

CROSS REFERENCE TO PRIOR APPLICATIONS

This application is a National Stage Patent Application of PCT International Patent Application No. PCT/KR2011/001593 (filed on Mar. 8, 2011) under 35 U.S.C. §371, which claims priority to Korean Patent Application No. 10-2010-0041817 (filed on May 4, 2010), which are all hereby incorporated by reference in their entirety.

TECHNICAL FIELD

The present invention relates to a motor. More particularly, the present invention relates to a stator assembly having a novel structure applied to motors.

BACKGROUND ART

Generally, a motor of which the rotor is positioned on an outer side of a stator is called "outer rotor type motor", while a motor with its rotor positioned on an inner side of a stator is called "inner rotor type motor". The present invention relates to a stator assembly for outer rotor type DD (Direct Driving) motor used for washing machines, or for inner rotor type motor mainly used for air conditioners.

FIG. 1 is an exploded perspective of a conventional stator assembly, and FIG. 2 is a perspective showing a hole sensor portion and a power lead portion coupled to a conventional stator assembly.

Referring to FIG. 1, the conventional stator assembly has a structure that an insulator 150 is coupled to both the top and bottom portions of a stator core 10. The stator core 10 includes a circular base 15, a plurality of teeth 11 radially formed along the circumference of the base 15, and slots 12 providing a space between the adjacent teeth 11. The insulator 150 includes a coupling bushing 151 formed on its inner side; a teeth insulating portion 152 surrounding the teeth 11 and supposed to be coil-wound; and a groove 153 formed to be coupled to the ends of the teeth 11. FIG. 1 shows an outer rotor type stator assembly, which is similar to an inner rotor type stator assembly excepting that the inner rotor type stator core includes teeth formed inwardly on an inner side of its base and has no coupling bushing.

Referring to FIG. 2, to the insulator 150 of the conventional stator assembly are coupled a hole sensor portion 160 for sensing magnetic flux, and a power lead portion 170 for providing an electrical connection to a power source. The stator assembly is designed to have the hole sensor portion 160 coupled to the insulator 150.

In the conventional stator assembly, the teeth insulating portion 152 of the insulator 150 is coupled to the teeth 11 of the stator core 10, and a coil 200 is wound around the teeth insulating portion 152. The teeth insulating portion 152 is formed integrally with the insulator 150 from a resin material through ejection molding. The thickness of the teeth insulating portion 152 is accordingly greater than that of the teeth 11, and slot 154 are smaller than the slots 12 of the stator core 10. This makes a difference in physical characteristics, such as a change in the magnetic flux through a constant number of windings, and adversely leads to an increase in the amount of resin consumption for ejection molding. When needed to selectively form the coupling bushing 151 and a hole sensor coupling portion 155 on the insulator 150 as shown in FIG. 2, the process requires an increase in the amount of resin consumption for ejection molding increases as well as more complicated molds, thus raising the material cost.

Moreover, as the hole sensor coupling portion 155 is formed in a single position of the insulator 150, there is a limitation in the position to fix the hole sensor that the hole sensor portion 160 can be coupled only to a single defined position.

To overcome the above-mentioned problems, the inventors of the present invention propose a stator assembly of a novel structure.

DISCLOSURE OF INVENTION

Technical Problem

Accordingly, the present invention has been made in view of the above-mentioned problems occurring in the prior art, and it is an object of the present invention to provide a stator assembly that includes a stator core with insulation coating, and an insulation film selectively inserted in the slots of the stator core, making it possible to insulate teeth without reducing the size of the slots.

It is another object of the present invention to provide a stator assembly that has a modified insulator structure of the stator core to remarkably reduce the amount of resin consumption for resin molding.

It is further another object of the present invention to provide a stator assembly that allows an arbitrary determination of the position of a hole sensor portion.

Solution to Problem

To achieve the above object, according to the present invention, there is provided a stator assembly that includes: a stator core having a circular base, a plurality of teeth radially formed along an outer circumference of the base, and at least one coupling bushing formed along an inner circumference of the base; an insulation coating layer formed on a surface of the stator core; and a pair of base insulators coupled to top and bottom portions of the base, respectively.

The stator assembly further includes an insulation film inserted in a slot providing a space between the adjacent teeth, to enhance insulation performance.

The stator assembly further includes a hole sensor portion having at least one hole IC portion formed in a perpendicular direction, and the hole IC portion has a coupling groove coupled to the teeth. The coupling groove of the hole sensor portion may be coupled to the teeth.

The hole sensor portion of the present invention includes at least one hole IC portion formed in a perpendicular direction; and a coupling groove formed on a lateral side of the hole IC portion. The coupling groove is coupled to the teeth of the stator core.

The method for manufacturing a stator assembly according to the present invention includes: preparing a stator core having a circular base, a plurality of teeth radially formed on the base, and a slot providing a space between the adjacent teeth; forming an insulation coating layer on a surface of the stator core; selectively inserting an insulation film in the slot of the stator core having the insulation coating layer; and coupling a base insulator to top and bottom portions of the base.

In another aspect of the present invention, there is provided a stator assembly that includes: a stator core having a circular base, and a plurality of teeth radially formed along an outer circumference of the base; an insulation coating layer formed on a surface of the stator core; and a pair of base insulators coupled to top and bottom portions of the base, respectively. The base insulators include at least one coupling bushing formed along an inner circumference of the base.

The stator assembly further includes an insulation film inserted in a slot providing a space between the adjacent teeth.

In further another aspect of the present invention, there is provided a stator assembly that includes: a stator core having a circular base, and a plurality of teeth radially formed along an inner circumference of the base; an insulation coating layer formed on a surface of the stator core; and a pair of base insulators coupled to top and bottom portions of the base, respectively.

The stator assembly further includes an insulation film inserted in a slot providing a space between the adjacent teeth.

Advantageous Effects of Invention

The present invention provides a stator assembly and a method for manufacturing the same that enables insulation of the teeth without reducing the size of slots, remarkably reduces the amount of resin consumption for resin molding, and makes it possible to arbitrarily determine the position of the hole sensor portion.

MODE FOR THE INVENTION

Hereinafter, an explanation on the preferred embodiments of the present invention will be given in detail with reference to the attached drawings.

Figure 1:
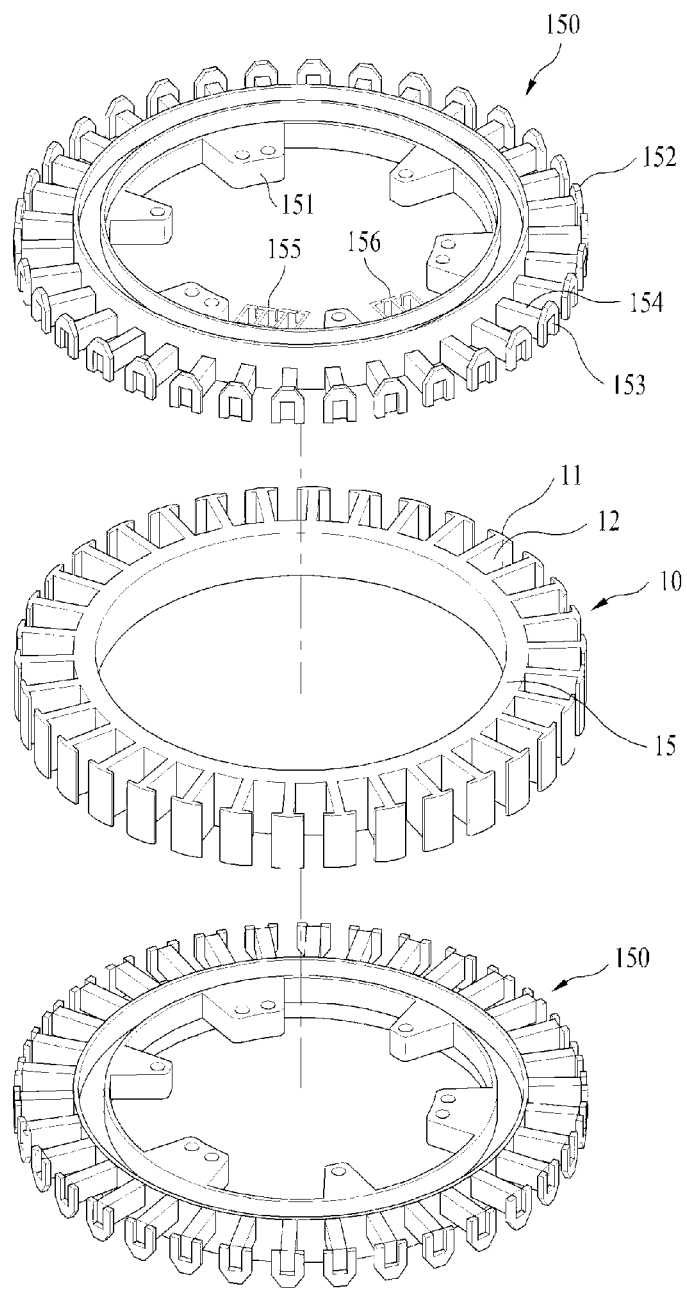
FIG. 1 is an exploded perspective of a conventional stator assembly for motor.
Figure 2:
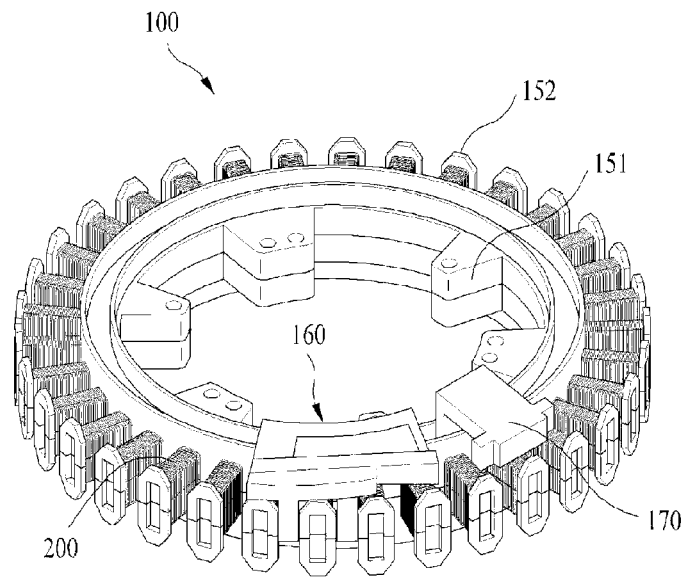
FIG. 2 is a perspective of a conventional stator assembly for motor.
Figure 3:
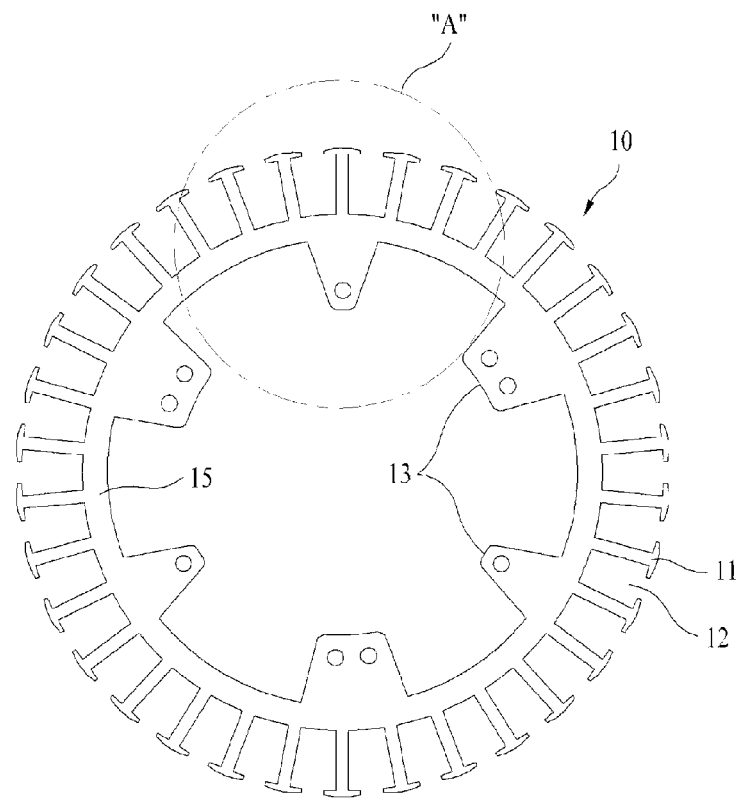
FIG. 3 is a plan view showing a stator core used for a stator assembly according to the present invention.

FIG. 3 is a plan view showing a stator core used for a stator assembly according to the present invention.

As shown in FIG. 3, which presents an overhead plan view, the stator core 10 of a stator assembly according to the present invention is prepared from a lamination of a film type steel sheet. The stator core 10 includes a circular base 15, a plurality of teeth 11 radially formed on an outer circumference of the base 15, and a slot 12 providing a space between the adjacent teeth 11. On an inner circumference of the base 15 are formed six coupling bushings 13 provided for fixedly coupling a stator. The number of the coupling bushings 13 is, of course, not limited to six. The present invention is not specifically limited to an outer rotor type stator assembly as illustrated herein, and may also be applied to an inner rotor type stator assembly in the same manner.

The stator core 10 is preferably formed from a lamination of the base 15 and the teeth 11 that are cut out together from an electrolytic steel sheet through blanking. The stator core 10 of the present invention may be formed by blanking an electrolytic steel sheet and winding it in spiral shape, or by preparing split cores from partially laminated steel sheets and combining them together (in split core method). In other words, the stator core 10 in the present invention preferably has the profile of FIG. 3 and may not be limited in its manufacturing method.

The coupling bushings 13 of the stator core 10 may be formed from a separate member other than the base 15 and welded to the base. The coupling bushings 13 may also be formed by a split core method, where an electrolytic steel sheet is cut up into the coupling bushing profile through blanking and then subjected to lamination. Otherwise, the coupling bushings 13 may not be formed from an electrolytic steel sheet but formed on an inner side of a base insulator 40 by plastic molding.

In the stator assembly of the present invention, an insulation coating layer 20 is applied on a surface of the stator core 10 to insulate the stator core 10. The insulation coating layer 20 is shown in FIG. 4.

Figure 4:
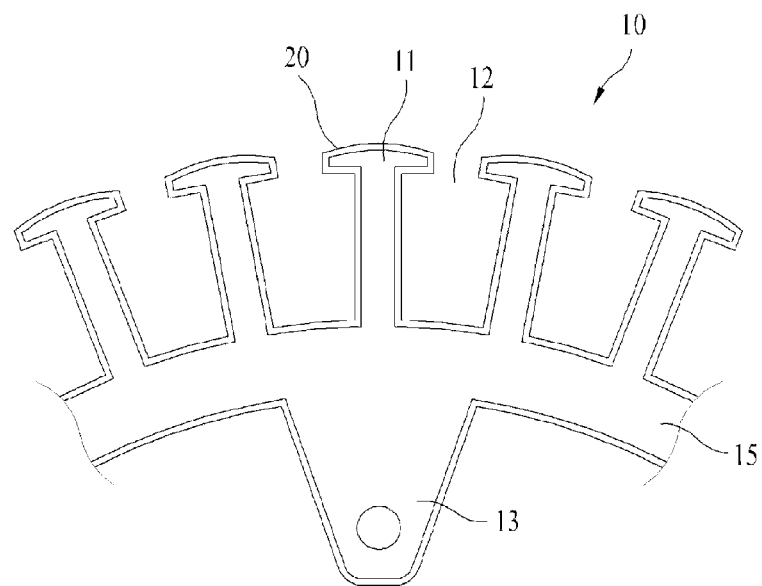
FIG. 4 is a schematic showing an insulation coating layer of the stator core used for the stator assembly according to the present invention, and a partial plan view showing an enlarged part A of FIG. 3.

FIG. 4 illustrates the insulation coating layer 20 of the stator core 10 used for the stator assembly according to the present invention, showing an enlarged part A of FIG. 3.

Referring to FIG. 4, the stator core 10 of the present invention is insulated with a thin conductive film coated on its surface. If not specifically limited in regard to insulating material or coating method, the present invention preferably involves applying an insulating powder to the surface of the stator core 10 by electrostatic coating. FIG. 4 shows the coupling bushing 13 formed from an electrolytic steel sheet. The coupling bushing 13 may be taken out from FIG. 4 in the case of plastic molding to form the coupling bushing 13. Though FIG. 4 depicts a stator core used for an outer rotor type motor, the present invention may also be applied to an inner rotor type motor in which the teeth 11 are formed on an inner circumference of the base 15 to face the center of the stator core 10.

Figure 5:
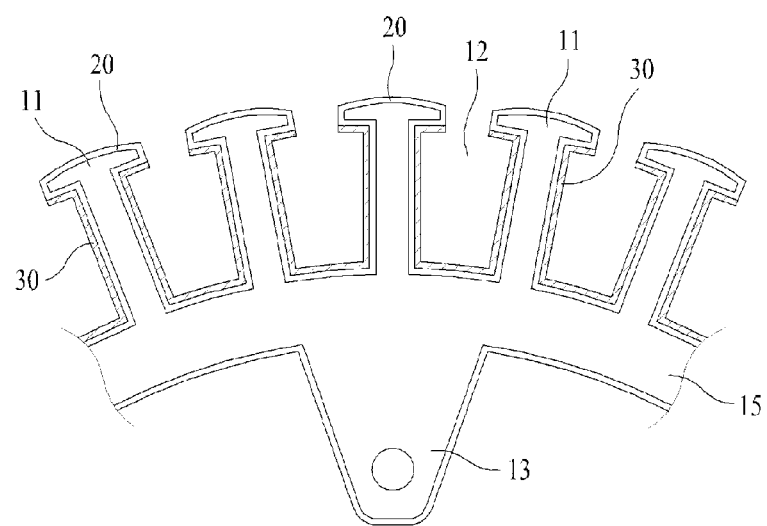
FIG. 5 is a schematic plan view showing an insulation film inserted in slots of the stator core used for the stator assembly according to the present invention.

For the stator core 10 with the insulation coating layer 20 formed by surface insulation, an insulation film 30 is selectively inserted in the slot 12 disposed between the adjacent teeth 11, as an option to enhance the insulation performance of the coil-wound teeth 11, which is illustrated in FIG. 5.

FIG. 5 is a partial enlarged view showing the insulation film 30 inserted in the slots 12 of the stator core 10 according to the present invention.

Referring to FIG. 5, the stator assembly of the present invention includes the thin insulation film 30 inserted in the slots of the stator core 10 to enhance the insulation performance of the teeth 11. The insulation film 30 may be optionally added when the insulation coating layer 20 alone exhibits insufficient insulation performance for required electromagnetic characteristics.

The insulation film 30 is bent and coupled to the slots 12 of the stator core 10 as shown in FIG. 5. This prevents a deterioration of electrical characteristics after winding with coils. The insulation film 30 is an insulating resin film 30, and is preferably formed from a flexile polymer resin in the present invention. The flexile polymer resin may include polyethyleneterephthalate (PET) resin, polycarbonate (PC) resin, or the like.

Figure 6:
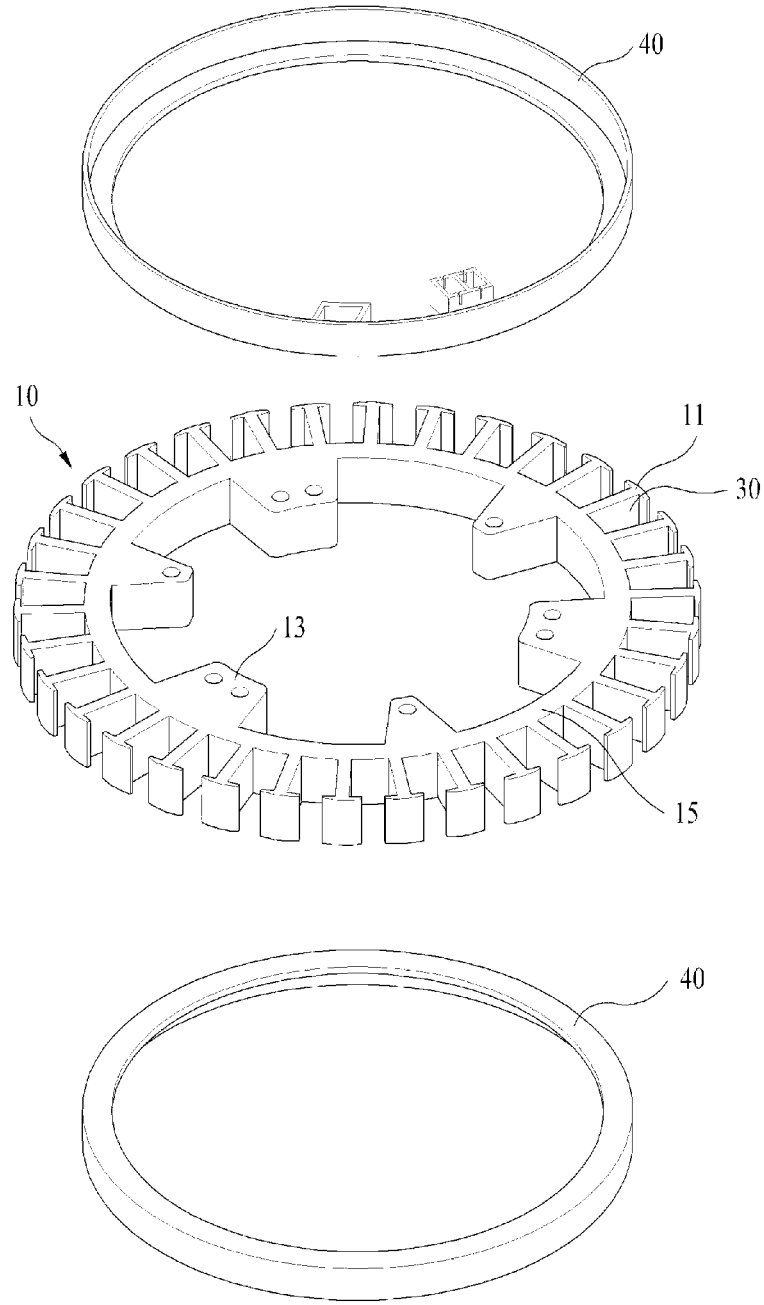
FIG. 6 is an exploded perspective of the stator assembly according to the present invention.

FIG. 6 is an exploded perspective of the stator assembly according to the present invention.

As shown in FIG. 6, the stator assembly of the present invention includes a pair of base insulators 40 coupled to the top and bottom portions of the stator core 10, respectively.

The stator core 10 of the present invention includes, as described above, the insulation coating layer 20 on the surface, and the insulation film 30 selectively inserted in the slots 11. The stator assembly of the present invention has an insulation structure using insulation coatings and films, while the conventional stator assembly has the respective teeth surrounded with an insulator. Accordingly, the present invention adopts the base insulator 40 in which the teeth part is not insulated. The base insulator 40 is, as shown in FIG. 6, coupled to the base 15 of the stator core 10. Though illustrated as formed on an inner side of the stator core 10, the coupling bushings 13 may also be formed on an inner side of the base insulator 40 through plastic resin molding.

Figure 7:
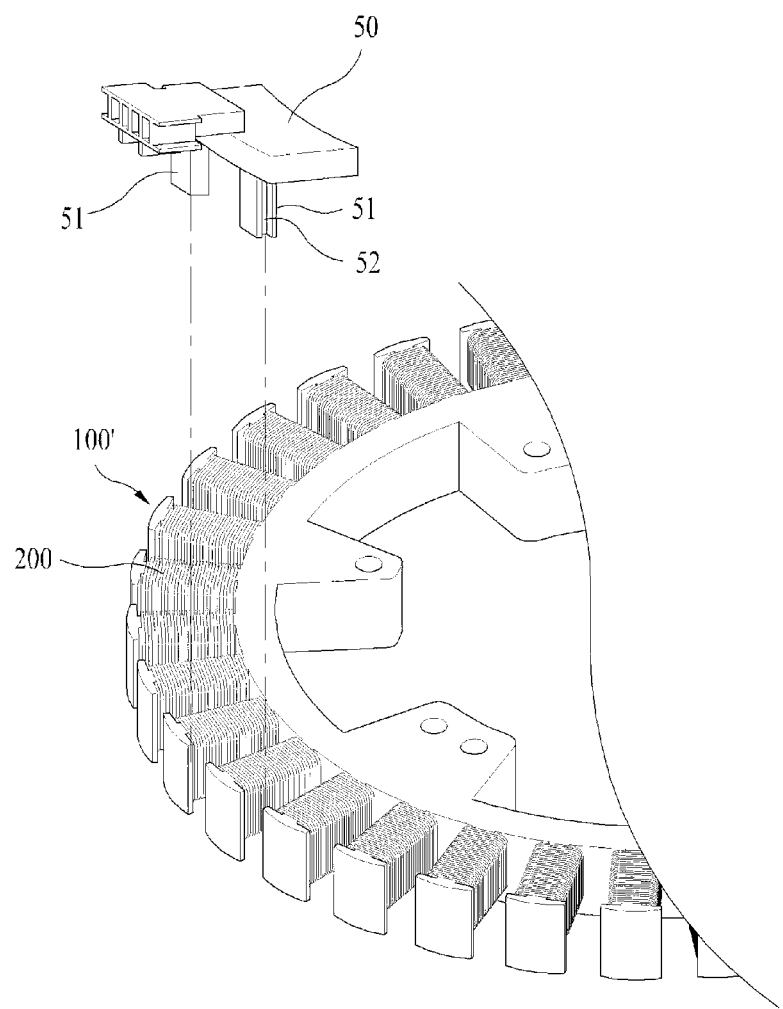
FIG. 7 is an exploded perspective showing a hole sensor portion coupled to the stator assembly according to the present invention.

FIG. 7 is an exploded perspective showing a hole sensor portion 50 coupled to the stator assembly according to the present invention.

As shown in FIG. 7, the hole sensor portion 50 of the present invention includes at least one hole IC inside. FIG. 7 shows a hole sensor portion having two hole ICs. Hole IC portion 51 with the hole ICs extends in a perpendicular direction, and a coupling groove 52 is formed on a lateral side of the hole IC portion 51 for the hole sensor portion 50 to be coupled to the teeth 11. The coupling groove 52 makes it possible to fix the hole sensor portion 50 to any one of the teeth 11 of the stator core 10. The conventional stator assembly in which the hole IC portion is coupled to the insulator requires more amount of resin consumption for molding to provide a hole IC coupling portion on the insulator, whereas the present invention using the above-described structure of the hole sensor portion 50 results in less amount of resin consumption for molding and enables the hole sensor portion 50 to be coupled to any one of the teeth 11.

Figure 8:
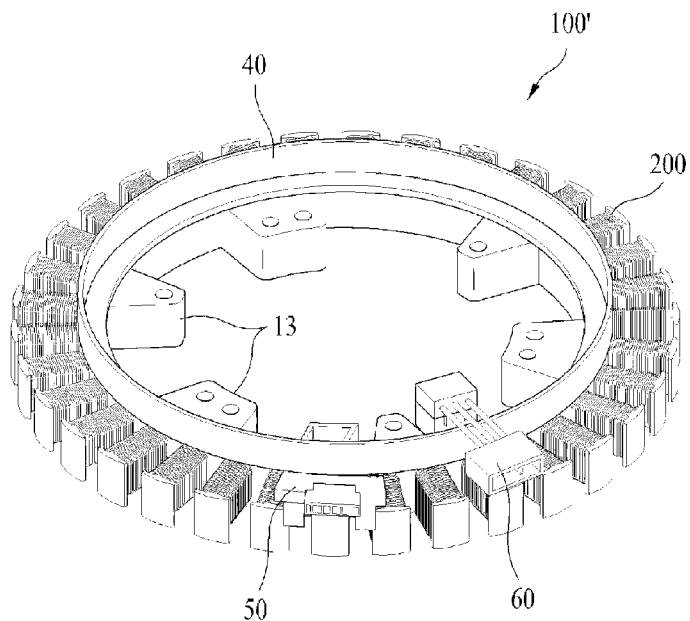
FIG. 8 is a perspective of the stator assembly according to the present invention.

FIG. 8 is a perspective of the stator assembly according to the present invention.

As shown in FIG. 8, the stator assembly of the present invention includes a pair of base insulators 40 coupled to the top and bottom portions of the stator core 10, respectively. The stator assembly also includes coupling bushings 13 formed on the inner side of the store core 10, and an insulation coating layer 20 on the surface of the store core 10. Though formed from the same material of the electrolytic steel sheet coupled to the inner side of the stator core 10 as shown in FIG. 8, the coupling bushings 13 may also be formed through plastic resin molding on an inner side of the base insulators 40. Coil 200 is wound around the respective teeth 11, and the hole sensor portion 50 is then coupled to the teeth 11. In FIG. 8 is depicted a power lead portion 60 coupled to the stator assembly for providing an electrical connection to a power source. Though FIG. 8 shows a stator assembly structure for outer rotor type motors, the present invention may also be applied to a stator assembly structure for inner rotor type motors.

Figure 9:
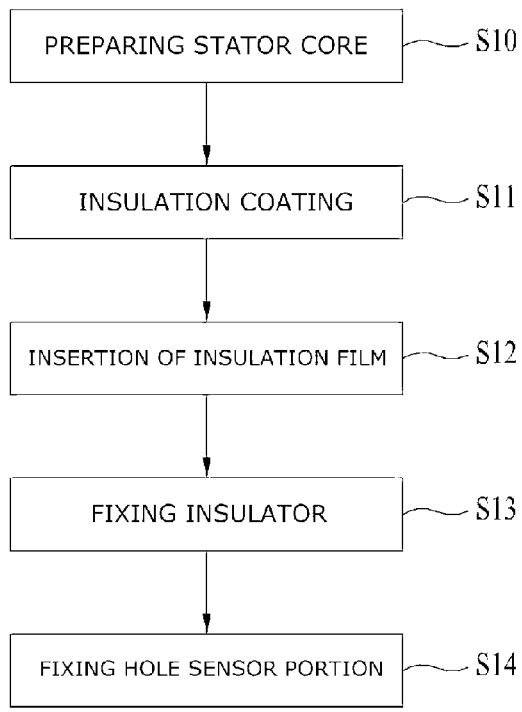
FIG. 9 is a flow chart showing a method for manufacturing a stator assembly according to the present invention.

FIG. 9 is a flow chart showing a method for manufacturing a stator assembly according to the present invention.

As shown in FIG. 9, a stator core 10 is first prepared in S10, where a plurality of coupling bushings 13 are formed on an inner side of the stator core 10. Otherwise, the coupling bushing 13 may be formed on an inner side of base insulators through plastic molding, in S13. The surface of the stator core 10 prepared in S10 is insulation-coated to form an insulation coating layer, in S11. If necessary, in an optional step S12, an insulation film 13 is inserted in teeth 11 of the stator core 10 covered with the insulation coating layer 20. The base insulators are then coupled to the base of the stator core 10. With a coil wound around the teeth 11, a hole sensor portion 14 is fixed to any one of the teeth 11, in S14, to complete the stator assembly of the present invention.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A stator assembly comprising:
   a stator core, comprising a circular base, a plurality of teeth radially formed along an outer circumference of the base, and at least one coupling bushing formed along an inner circumference of the base,
   wherein a tooth of the plurality of teeth includes:
   i) a first portion extended from the circular base and on which a coil is wound, and
   ii) a second portion extended from an end of the first portion and having a) a first side facing the circular base, b) a second side facing adjacent tooth, and c) a third side facing an outside of the stator core;
   an insulation coating layer formed on an surface of the stator core;
   a pair of base insulators coupled to top and bottom portions of the base, respectively; and
   a hall sensor portion having a hall IC portion positioned between two adjacent second portions of the plurality of teeth and having a coupling groove formed at a side of the hall IC portion,
   wherein the first, second, and third sides at an end of the second portion of the tooth are inserted into the coupling groove such that the hall sensor portion is fixed on the tooth.

2. The stator assembly as claimed in claim 1, further comprising:
   an insulation film inserted in a slot providing a space between the adjacent teeth.

3. A stator assembly comprising:
   a stator core including a circular base, and a plurality of teeth radially formed along an outer circumference of the base,
   wherein a tooth of the plurality of teeth includes:
   i) a first portion extended from the circular base and on which a coil is wound, and
   ii) a second portion extended from an end of the first portion and having a) a first side facing the circular base, b) a second side facing adjacent tooth, and c) a third side facing an outside of the stator core;
   an insulation coating layer formed on a surface of the stator core; and
   a pair of base insulators coupled to top and bottom portions of the base, respectively, the base insulators having at least one coupling bushing formed along an inner circumference of the base; and
   a hall sensor portion having a hall IC portion positioned between two adjacent second portions of the plurality of teeth and having a coupling groove formed at a side of the hall IC portion,
   wherein the first, second, and third sides at an end of the second portion of the tooth are inserted into the coupling groove such that the hall sensor portion is fixed on the tooth.

4. The stator assembly as claimed in claim 3, further comprising an insulation film inserted in a slot providing a space between the adjacent teeth.

5. A stator assembly comprising:
a stator core including a circular base, and a plurality of teeth radially formed along an inner circumference of the base,
   wherein a tooth of the plurality of teeth includes:
   i) a first portion extended from the circular base and on which a coil is wound, and
   ii) a second portion extended from an end of the first portion and having a) a first side facing the circular base, b) a second side facing adjacent tooth, and c) a third side facing an outside of the stator core;
an insulation coating layer formed on a surface of the stator core;
a pair of base insulators coupled to top and bottom portions of the base, respectively; and
a hall sensor portion having a hall IC portion positioned between two adjacent second portions of the plurality of teeth and having a coupling groove formed at a side of the hall IC portion,
wherein the first, second, and third sides at an end of the second portion of the tooth are inserted into the coupling groove such that the hall sensor portion is fixed on the tooth.

6. The stator assembly as claimed in claim 5, further comprising an insulation film inserted in a slot providing a space between the adjacent teeth.

* * * * *